(12) United States Patent
Namou et al.

(10) Patent No.: US 10,179,566 B2
(45) Date of Patent: Jan. 15, 2019

(54) HIGH VOLTAGE ELECTRICAL SYSTEMS AND DISCONNECT MECHANISMS

(71) Applicant: GM GLOBAL TECHNOLOGY OPERATIONS LLC, Detroit, MI (US)

(72) Inventors: Andrew J. Namou, West Bloomfield, MI (US); David J. Mifsud, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 15/181,972

(22) Filed: Jun. 14, 2016

(65) Prior Publication Data

US 2017/0355350 A1    Dec. 14, 2017

(51) Int. Cl.
| | | |
|---|---|---|
| B60L 1/00 | (2006.01) | |
| H02J 1/00 | (2006.01) | |
| B60R 25/04 | (2013.01) | |
| B60R 16/04 | (2006.01) | |
| B60L 11/18 | (2006.01) | |
| H02H 9/00 | (2006.01) | |
| H02J 7/00 | (2006.01) | |

(52) U.S. Cl.
CPC ............. *B60R 25/04* (2013.01); *B60L 1/00* (2013.01); *B60L 11/18* (2013.01); *B60L 11/1868* (2013.01); *B60R 16/04* (2013.01); *H02H 9/001* (2013.01); *H02J 1/00* (2013.01); *H02J 7/0031* (2013.01); *B60L 2270/20* (2013.01)

(58) Field of Classification Search
CPC ..................................... B60L 1/00; H02J 1/00
USPC ........................................................ 307/10.1
See application file for complete search history.

(56) References Cited

U.S. PATENT DOCUMENTS

| | | | | | |
|---|---|---|---|---|---|
| 5,619,107 | A | * | 4/1997 | Shinohara | B60L 3/00 307/10.7 |
| 6,828,742 | B2 | * | 12/2004 | Suzuki | B60K 6/485 180/65.26 |
| 8,294,293 | B2 | * | 10/2012 | Fukazu | B60K 1/00 136/230 |
| 9,381,819 | B2 | * | 7/2016 | Wu | B60L 1/00 |
| 2001/0013725 | A1 | * | 8/2001 | Mizuguchi | B60R 16/0207 307/10.1 |
| 2001/0035685 | A1 | * | 11/2001 | Tamai | H02J 7/1423 307/10.1 |
| 2011/0050136 | A1 | * | 3/2011 | Sumi | B60L 3/04 318/400.3 |
| 2012/0091792 | A1 | * | 4/2012 | Wu | B60L 1/00 307/10.1 |

(Continued)

*Primary Examiner* — Adi Amrany
(74) *Attorney, Agent, or Firm* — Quinn IP Law (57) ABSTRACT

An electrical system includes a contactor having a pair of contacts and a coil configured to electrically close and open the contacts. The electrical system also includes a high voltage ("HV") circuit including a power supply electrically connected to at least one of the contacts of the contactor. The electrical system further includes a low voltage ("LV") circuit electrically connected to the coil and configured to selectively energize the coil of the contactor. A disconnect mechanism is coupled with the LV electrical circuit and operable to electrically open the LV electrical circuit to actuate electrical opening of the contacts of the contactor.

18 Claims, 8 Drawing Sheets

(56) References Cited

U.S. PATENT DOCUMENTS

2012/0139338 A1* 6/2012 Kim ..................... B60L 1/00
 307/10.1
2013/0154672 A1* 6/2013 Fabregas ............ G01R 31/3606
 324/713

* cited by examiner

HIGH VOLTAGE ELECTRICAL SYSTEMS AND DISCONNECT MECHANISMS

TECHNICAL FIELD

The disclosure generally relates to high voltage ("HV") electrical systems and particularly to opening HV electrical circuits in HV electrical systems in vehicles.

BACKGROUND

Electric and hybrid electric vehicles utilize a high voltage electrical system to drive one or more electric motors and, thus, propel the vehicle. Such systems typically include a power supply, e.g., a battery, and a load, e.g., the one or more electric motors. These power supply and load are connected together as part of a high voltage ("HV") electrical circuit.

Typically, one or more contactors are utilized to "close" and "open" the HV electrical circuit. That is, the one or more contactors are utilized to connect and disconnect the power supply from the load. However, it is sometimes necessary to manually open the HV electrical circuit. For instance, service technicians may need to open the HV electrical circuit before performing maintenance or service on the vehicle.

SUMMARY

An electrical system according to one exemplary embodiment includes a contactor having a pair of contacts and a coil configured to electrically close and open the contacts. The electrical system also includes a high voltage ("HV") circuit including a power supply electrically connected to at least one of the contacts of the contactor. The electrical system further includes a low voltage ("LV") circuit electrically connected to the coil and configured to selectively energize the coil of the contactor. A disconnect mechanism is coupled with the LV electrical circuit and operable to electrically open the LV electrical circuit to actuate electrical opening of the contacts of the contactor.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an electrical system 100 is shown and described herein.

Figure 1:
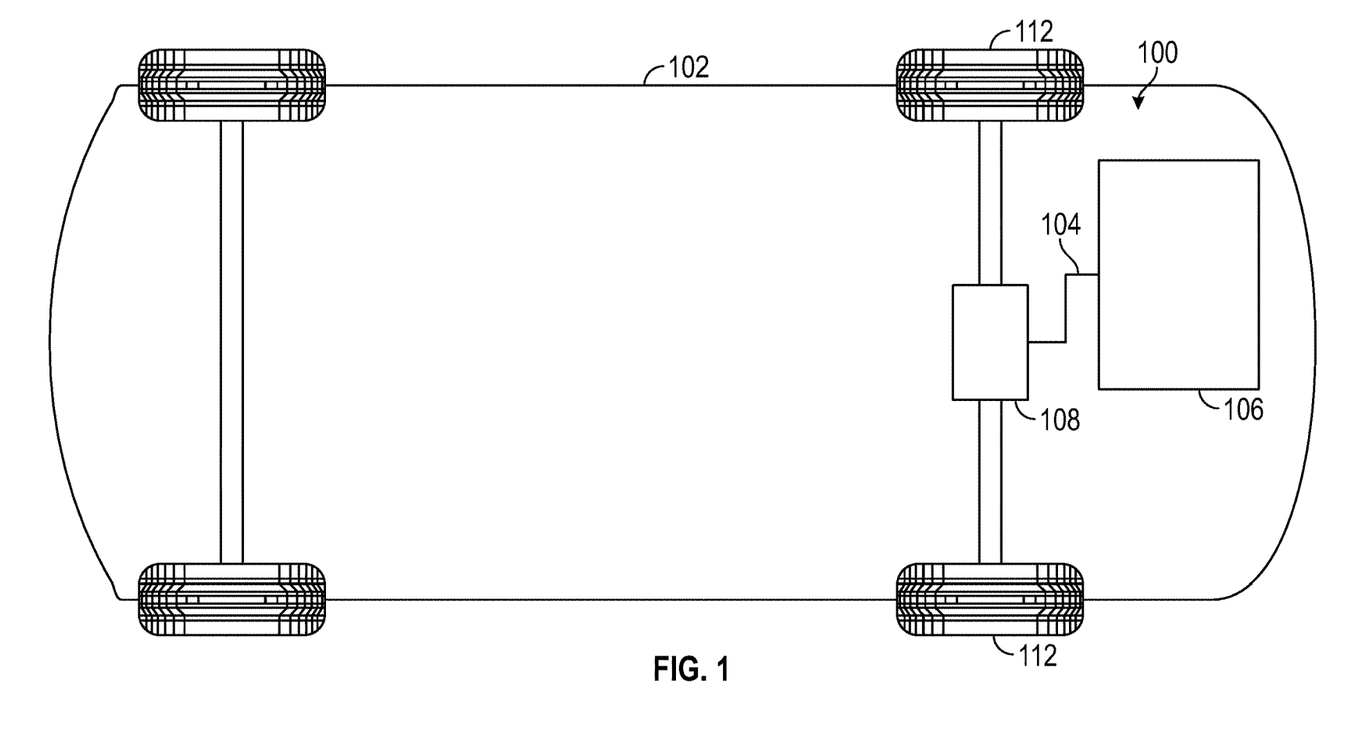
FIG. 1 is a block diagram of an electrical system implemented in a vehicle according to one exemplary embodiment.

The electrical system 100 shown in the exemplary embodiment of FIG. 1 is implemented in a vehicle 102 such as an automobile (not separately numbered). However, it should be appreciated that the electrical system 100 may be implemented in other vehicles 102, including, but not limited to, motorcycles, aircraft, locomotives, and boats. Furthermore, the electrical system 100 shown and described herein may also be implemented in non-vehicle applications (not shown).

The electrical system 100 includes a high voltage ("HV") electrical circuit 104. In the exemplary embodiment, the HV electrical circuit 104 is configured to support voltages greater than 60 volts ("V"). However, it should be appreciated that the HV electrical circuit may be configured to support any voltage.

An HV power supply 106 is electrically connected to the HV electrical circuit 104 for supplying power to the HV electrical circuit 104. The HV electrical circuit 104 is also electrically connected to a load 108. In one exemplary embodiment, the load 108 may include a traction power invertor module ("TPIM") (not separately shown), sometimes referred to simply as a "traction invertor." The load 108 of the one exemplary embodiment may also include an electric motor (not separately shown) electrically connected to the TPIM. The electric motor may be coupled to an axle (not numbered) and/or wheels 112 for propelling the vehicle 102 as is appreciated by those skilled in the art.

Figure 2:
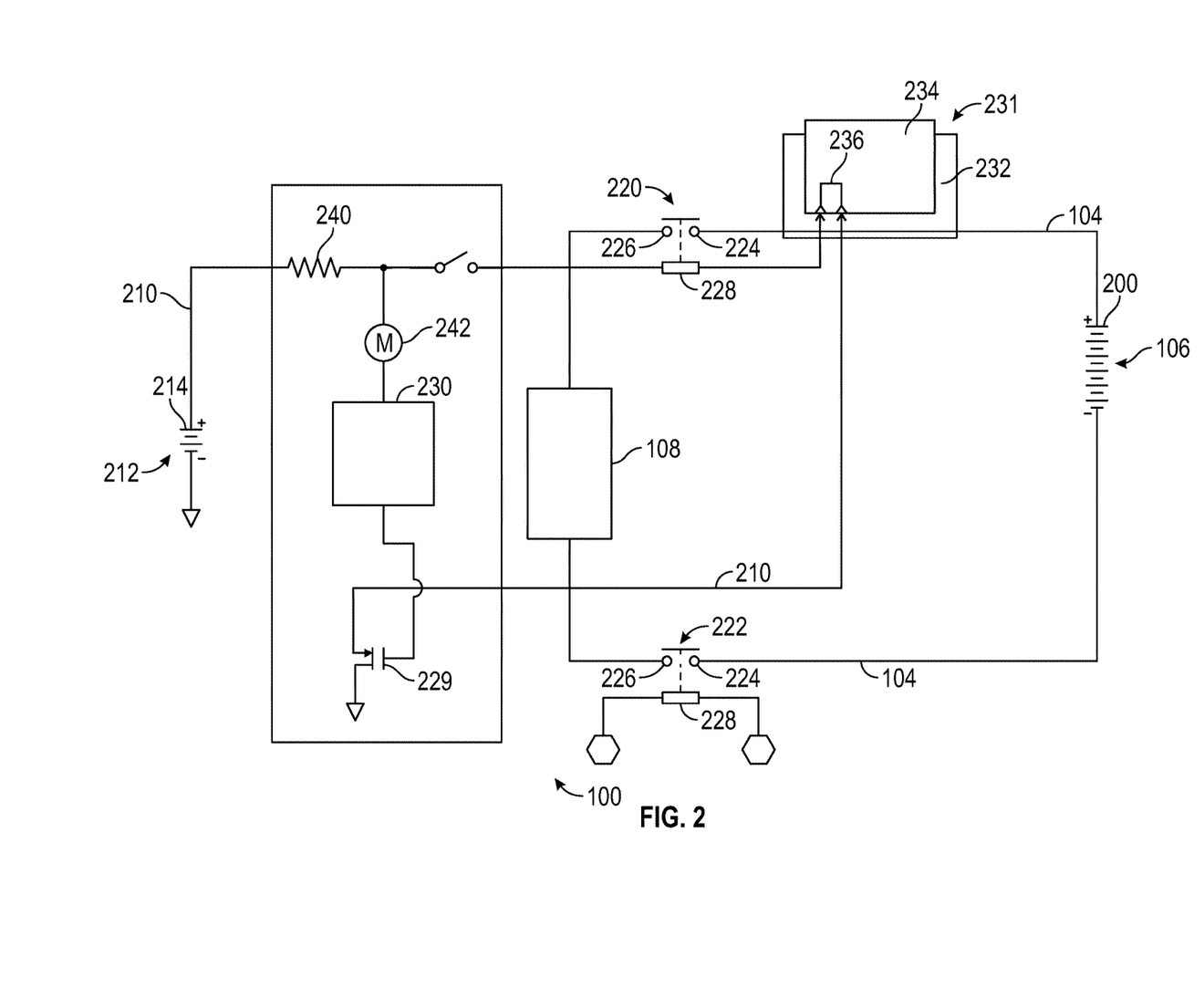
FIG. 2 is an electrical schematic diagram of the electrical system with a low voltage ("LV") electrical circuit openable with a disconnect mechanism according to one exemplary embodiment.

In the exemplary embodiment shown in FIG. 2, the HV power supply 106 includes a battery 200 having a plurality of cells (not separately numbered). Of course, the HV power supply 106 may be implemented with other devices including, but not limited to, a solar cell (not shown). Furthermore, a plurality of HV power supplies 106 may be electrically connected to the HV electrical circuit 104.

Still referring to FIG. 2, the electrical system 100 further includes a low voltage ("LV") electrical circuit 210. In the exemplary embodiment, the LV electrical circuit 210 is configured to support voltages of about 12 volts (V). However, it should be appreciated that the LV electrical circuit may be configured to support any voltage. The LV electrical circuit 210 includes an LV power supply 212. In the exemplary embodiment, the LV power supply 212 includes a battery 214 having a plurality of cells (not separately numbered). Of course, the LV power supply 212 may be implemented with other devices, as appreciated by those skilled in the art. Furthermore, the LV electrical circuit 210 may include a plurality of LV power supplies 212.

The electrical system 100 further includes at least one contactor 220, 222 for opening (i.e., preventing current flow) and or closing (i.e., enabling current flow) the HV electrical circuit 104. Each contactor 220, 222 includes a first contact 224, a second contact 226, and a coil 228. When energized, the coil 228, i.e., an electromagnet, actuates a mechanism (not numbered) to electrically connect or disconnect the contacts 224, 226 to close or open the circuit, as is appreciated by those skilled in the art.

In the exemplary embodiment shown in FIG. 2, the system 100 includes a positive contactor 220 electrically connected to a positive pole (not numbered) of the HV power supply 106 and a negative contactor 222 electrically connected to a negative pole (not numbered) of the HV power supply 106. More specifically, the first contact 224 of each contactor 220, 222 is electrically connected to the HV power supply 106 and the second contact 226 of each contactor 220, 222 is electrically connected to the load 108. It should be appreciated that the system 100 may alternately implement only a single contactor or additional contactors (e.g., a pre-charge contactor).

The LV electrical circuit 210 of the exemplary embodiments also includes at least one transistor 229 in communication with at least one of the contactors 220, 222 for operating the respective contactor 220, 222. In the exemplary embodiment shown in FIG. 2, a first transistor 229 is electrically connected to the coil 228 of the first contactor 220. The first transistor 229 may be activated and/or deactivated by a controller 230 to selectively operate the positive contactor 220. Of course, other switching mechanisms (not shown) may be utilized instead of and/or in addition to the at least one transistor 229. Furthermore, additional transistors and/or other switching mechanisms may be utilized in operation of the various contactors 220, 222.

The electrical system 100 includes a disconnect mechanism 231. The disconnect mechanism 231 may alternatively be referred to as a "manual service disconnect" and/or abbreviated as an "MSD". In the exemplary embodiments, the disconnect mechanism 231 is implemented with a receptacle 232 and a plug 234 removable from the receptacle 232. In the exemplary embodiments, the plug 234 is formed in part of a non-conductive material, e.g., plastic or ceramic. The plug 234 includes a first conductive path 236 to complete the LV electrical circuit 210 when the plug 234 is disposed in the receptacle 232. The first conductive path 236 is formed primarily of a conductive material, e.g., a metal, encased in the non-conductive material. As such, a user may safely grasp the plug 234 with their hand to remove it from the receptacle 232. However, it should be appreciated that the disconnect mechanism 231 may be implemented with other devices, e.g., a switch (not shown), in other embodiments.

The disconnect mechanism 231 is coupled with the LV electrical circuit 210 and operable to electrically open the LV electrical circuit 210 to actuate electrical opening of the contacts 224, 226 of at least one of the contactors 220, 222. In the exemplary embodiment shown in FIG. 2, when the LV electrical circuit 210 is opened, e.g., by removal of the plug 234 from the receptacle 232, then the coil 228 of the positive contactor 220 is de-energized, which causes the contacts 224, 226 of the positive contactor 220 to open. Thus, the HV electrical circuit 104 is opened and current will cease flowing between the HV power supply 106 and the load 108.

Figure 3:
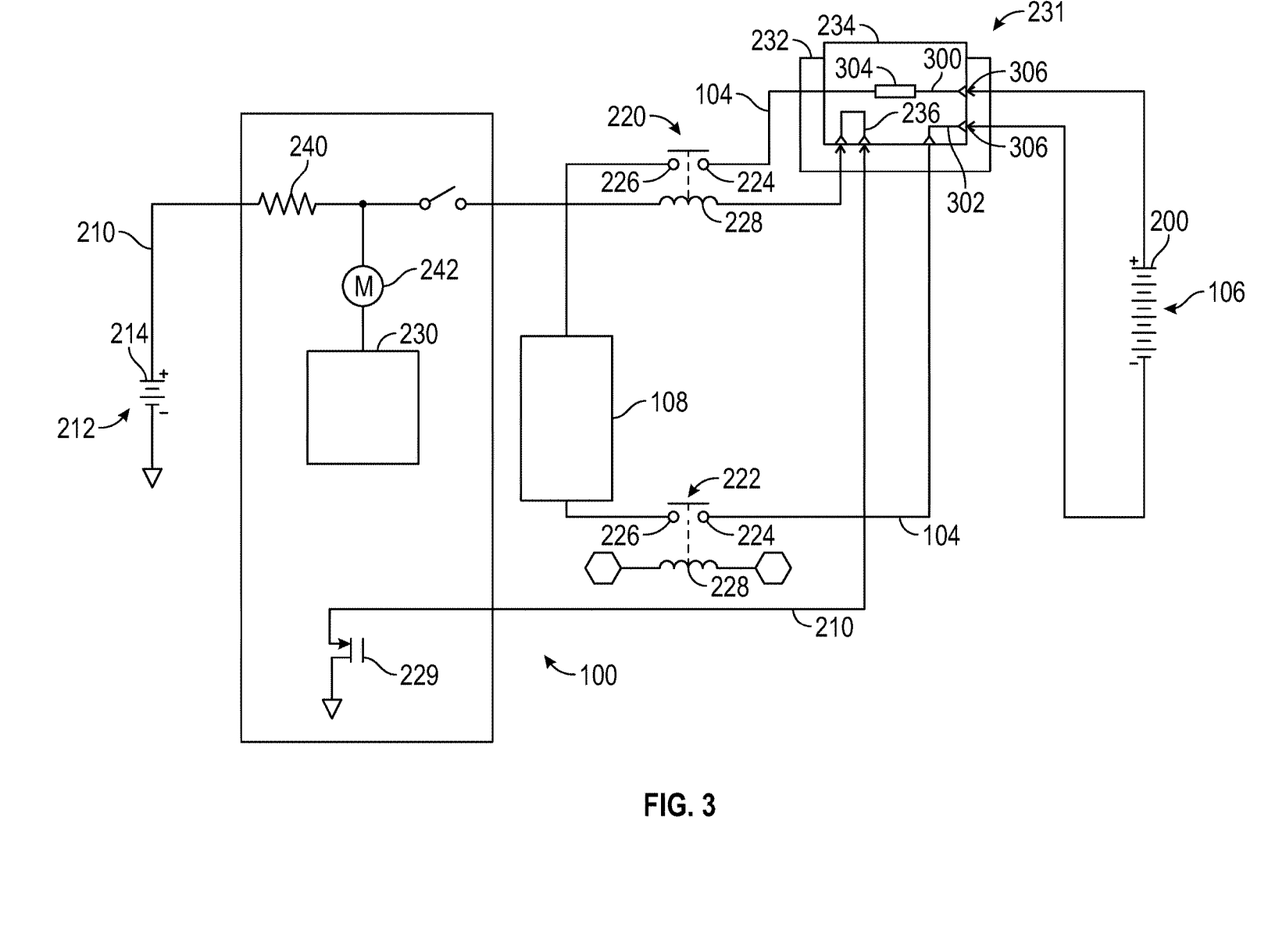
FIG. 3 is an electrical schematic diagram of the electrical system with the LV electrical circuit and a high voltage ("HV") electrical circuit openable with the disconnect mechanism having a plug disposed in a receptacle according to one exemplary embodiment.

In some exemplary embodiments, e.g., the embodiment shown in FIG. 3, the disconnect mechanism 231 is coupled with the HV electrical circuit 104 and configured to electrically open the HV electrical circuit 104. More specifically, the disconnect mechanism 231 is configured to electrically disconnect the HV power supply 106 from the load 108. Even more specifically, the disconnect mechanism 231 of the exemplary embodiment of FIG. 3 is operable to electrically disconnect the positive pole of the HV power supply 106 from one of the contacts 224, 226 of the positive contactor 220 and electrically disconnect the negative pole of the HV power supply 106 from one of the contacts 224, 226 of the negative contactor 222. As such, in these embodiments, the disconnect mechanism 231 provides an additional mechanism to open the HV electrical circuit 104 and disconnect the HV power supply 106 from the load 108.

In the exemplary embodiment shown in FIG. 3, the HV electrical circuit 104 is routed through the plug 234 from both the positive pole of the HV power supply 106 and the negative pole of the HV power supply 106. More specifically, the plug 234 includes a second conductive path 300 to electrically connect the positive pole of the HV power supply 106 and the first contact 224 of the positive contactor 220 when the plug 234 is disposed in the receptacle 232. The plug 234 also includes a third conductive path 302 to electrically connect the negative pole of the HV power supply 106 and the first contact 224 of the negative contactor 222. However, it should be appreciated that other techniques to electrically open the HV electrical circuit 104 with the disconnect mechanism 231 may be implemented.

In one exemplary embodiment, the disconnect mechanism 231 is configured to open the LV electrical circuit 210 prior to opening the HV electrical circuit 104. As described above, when the LV electrical circuit 210 is opened, the contacts 224, 226 of the at least one contactor 220, 222 are opened. As such, the load 108 may be disconnected from the HV power supply 106 prior to the opening of the HV electrical circuit 104 by the disconnect mechanism 231.

This configuration may eliminate or greatly decrease the chance of arcing within the disconnect mechanism 231. With arcing reduced, usable life of the disconnect mechanism 231 may be increased. For instance, the mechanical disconnect contacts (not numbered) of the disconnect mechanism 231 which will not see high power. Therefore, these contacts need not be designed in such a way to withstand the high temperatures associated with such high power. This prevents the plug 234 from becoming damaged or compromised potentially causing further damage once inserted back into the receptacle 232. Also, this configuration does not require that the disconnect mechanism 231 include one or more resistors that are typically used to detect when the plug 234 is removed from the receptacle 232.

The disconnect mechanism 231 may also include a fuse 304 disposed in series with the HV electrical circuit 104, as shown in FIG. 3. As appreciated by those skilled in the art, the fuse 304 opens the circuit 104 in the event of current exceeding a predetermined level.

Figure 4:
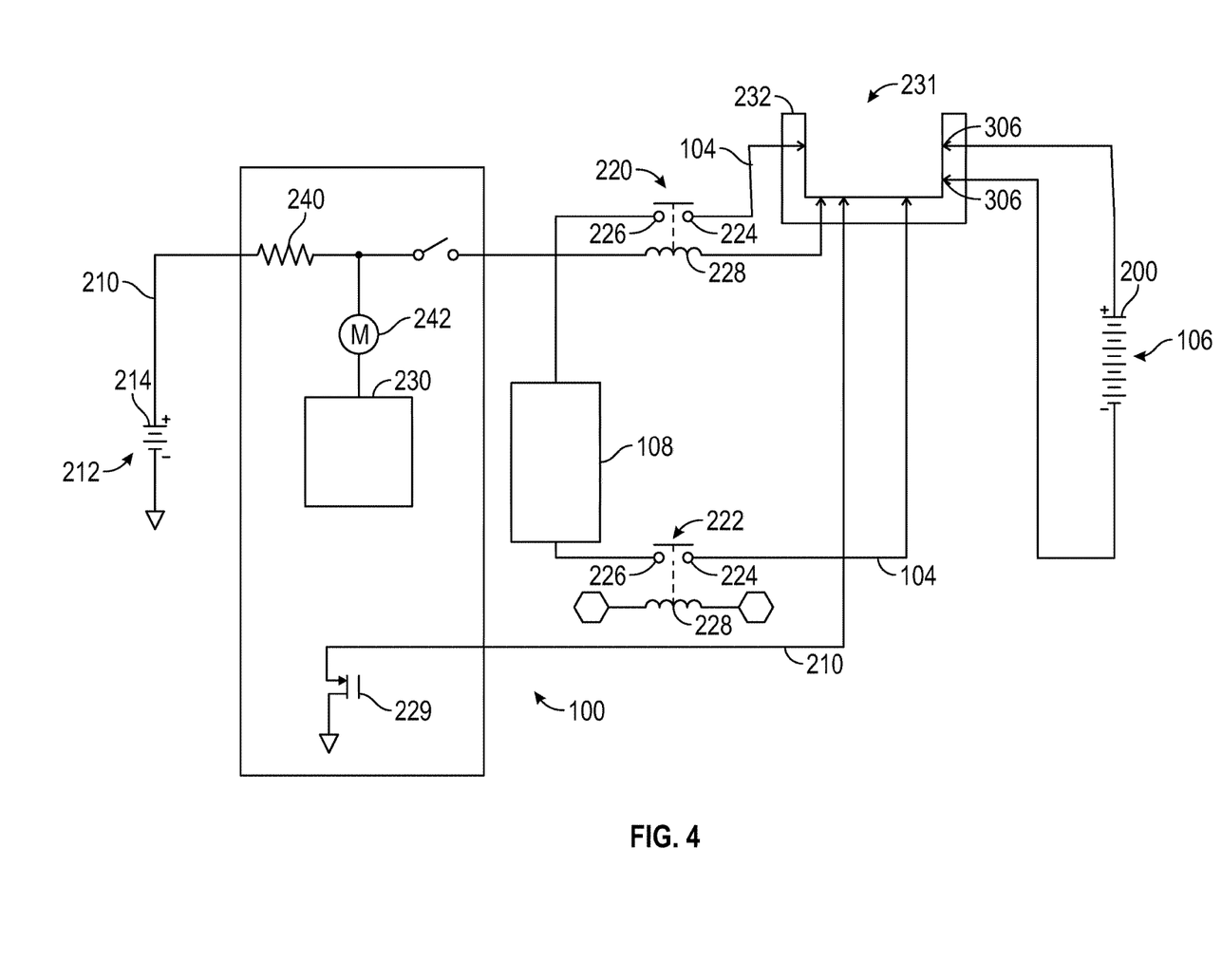
FIG. 4 is an electrical schematic diagram of the electrical system of FIG. 3 with the plug of the disconnect mechanism removed from the receptacle according to one exemplary embodiment.

The electrical system 100 may include at least one HV access point 306 electrically connected to the HV power supply 106. The at least one HV access point 306 facilitates electrical measurement, e.g., a voltage measurement, to be made of the HV power supply 106. For example, FIG. 4 illustrates the electrical system 100 of FIG. 3 with the plug 234 removed from the receptacle 232. With the plug 234 removed from the receptacle, a pair of HV access points 306 are exposed to allow electrical measurement. The system 100 may further include, for example, a specialized measurement device and/or adapter (not shown) to be inserted into the receptacle 232 to permit easy access to the HV access points 306. Furthermore, access to electric power from the HV power supply 106 may be permitted via access to the HV access points 306.

Figure 5:
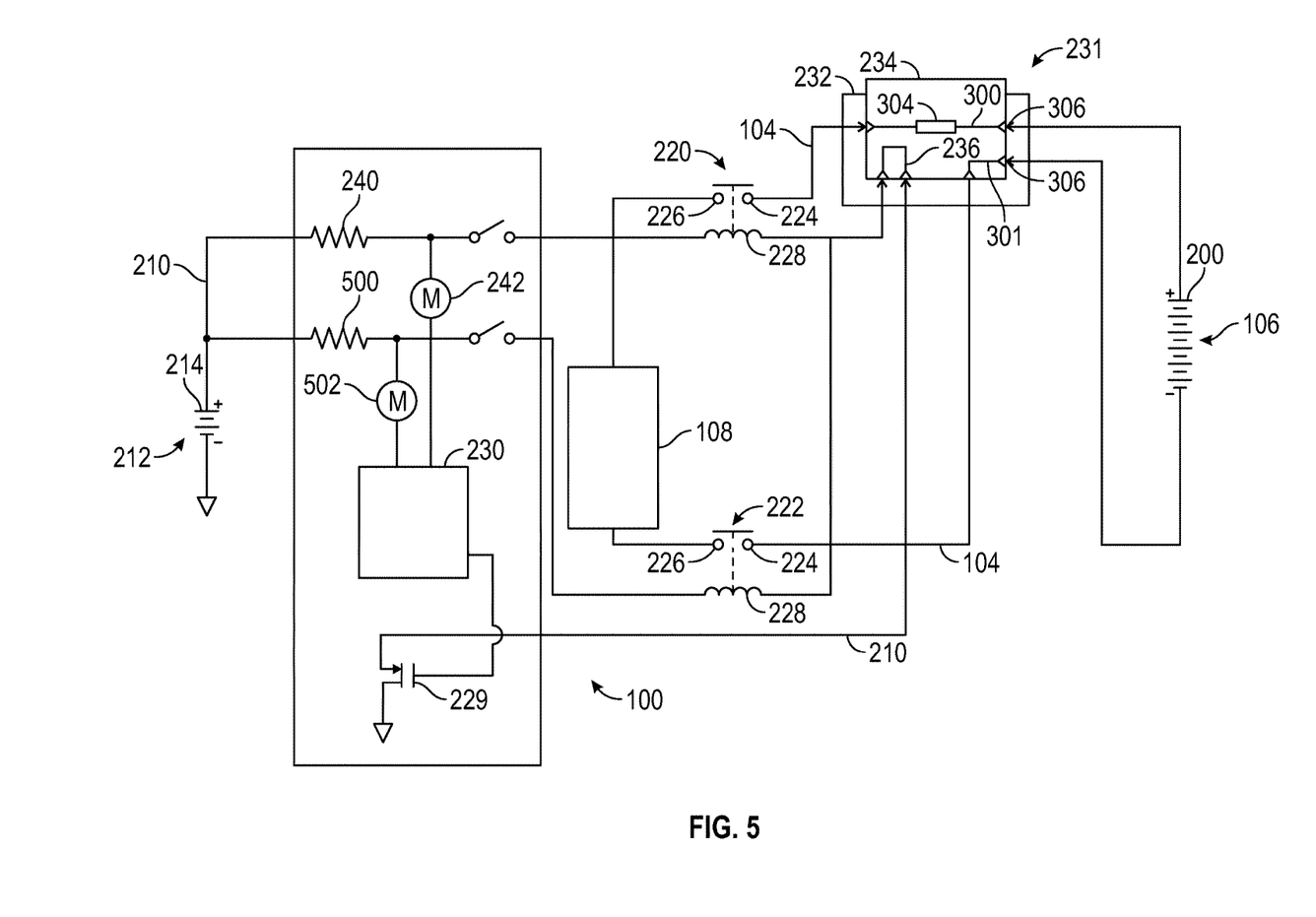
FIG. 5 is an electrical schematic diagram of the electrical system with the LV electrical circuit having a pair of sense resistors according to one exemplary embodiment.

In the exemplary embodiment shown in FIG. 5, the LV electrical circuit 210 powers the coils 228 of both the positive contactor 220 and the negative contactor 222. As such, the disconnect mechanism 231 may be utilized to remove power from both coils 228 when opening the LV electrical circuit 210, thus opening the contacts 224, 226 of the both the positive and negative contactors 220, 222.

Figure 6:
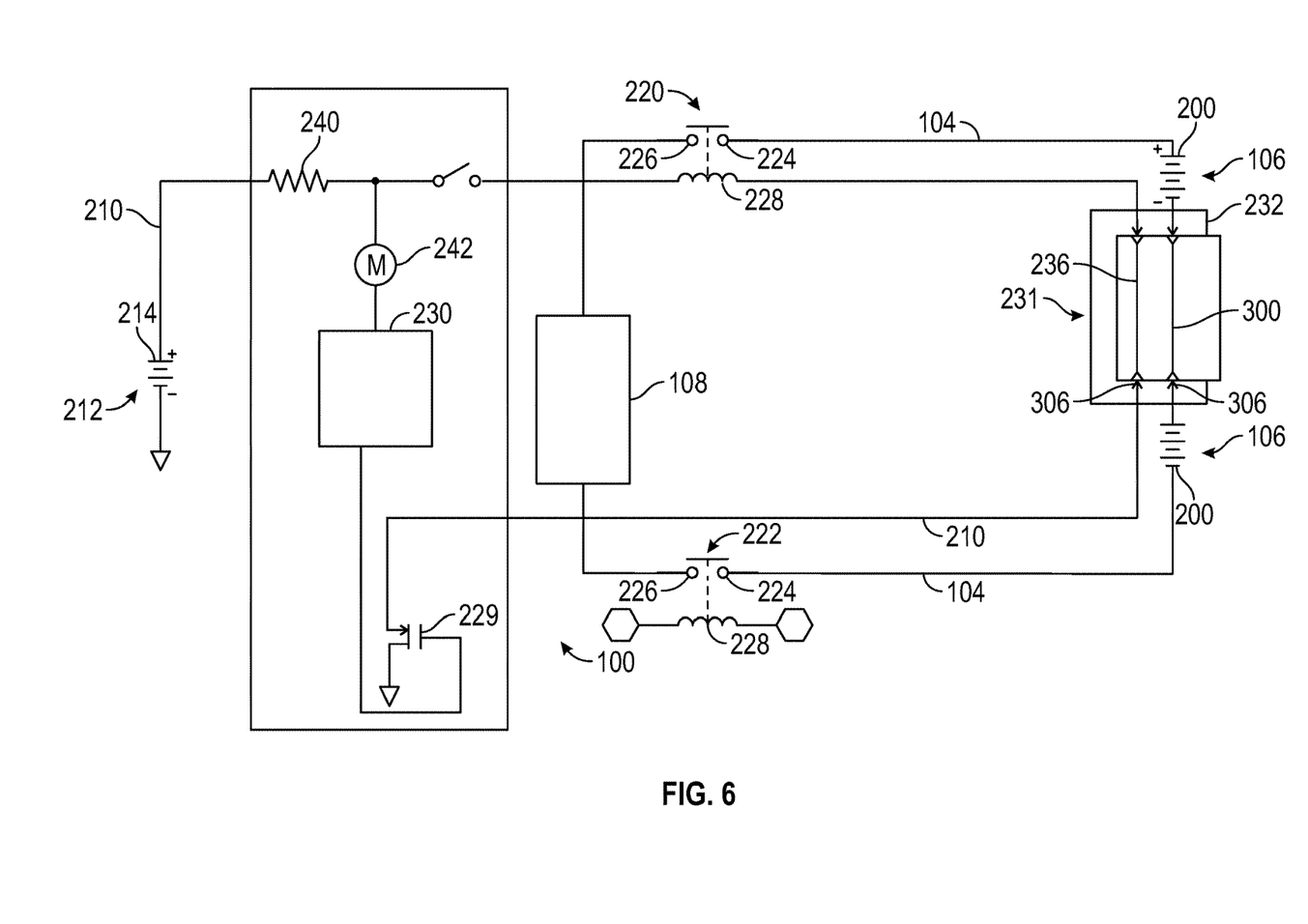
FIG. 6 is an electrical schematic diagram of the electrical system with the disconnect mechanism disposed within an HV power supply according to one exemplary embodiment.

The disconnect mechanism 231 may be disposed at a variety of physical locations and/or at various locations electrically within the electrical system 100. For example, in the exemplary embodiment shown in FIG. 6, the disconnect mechanism 231 may be disposed within the HV power supply 106. More specifically, in this exemplary embodiment, the disconnect mechanism 231 is disposed in series between two of the cells of the battery 200.

Referring to FIGS. 2-6, the LV electrical circuit 210 may include at least one sense resistor 240, 500. In the exemplary embodiments shown in FIGS. 2-6, a first sense resistor 240 is disposed in series between the positive pole of the LV power supply 212 and the coil 228 of the positive contactor 220. A first current sensor 242 is disposed adjacent the sense resistor 240 for sensing the current flowing through the sense resistor 240. The controller 230 is in communication with the first current sensor 242 for receiving data corresponding to the current flowing through the sense resistor 240. The exemplary embodiment of FIG. 5 further includes a second sense resistor 500 disposed in series between the positive pole of the LV power supply 212 and the coil 228 of the negative contactor 222. Likewise, a second current sensor 502 is implemented similar to the first current sensor 242 described above. The sense resistors 240, 500 and current sensors 242, 502 may be utilized to detect opening or closing of the disconnect mechanism 231 as the current sink will change, as viewed by the controller 230.

The sense resistors 240, 500 and thus, the coils 228, may also be utilized to indicate whether or not the contacts 224, 226 of the contactors 220, 222 are welded or otherwise fused. Particularly, the inductance of the coils 228 changes depending on the shaft position of the contactors 220, 222. As such, an electrical "signature" can be detected when the contactors 220, 222 are welded versus not. This signature may be detected in the first few moments of energization of the coil 228. Therefore, the controller 230 may use the data provided by the current sensor 242, 502 to determine whether or not the contacts 224, 226 of the contactor 220, 222 are welded or otherwise fused.

Figure 7:
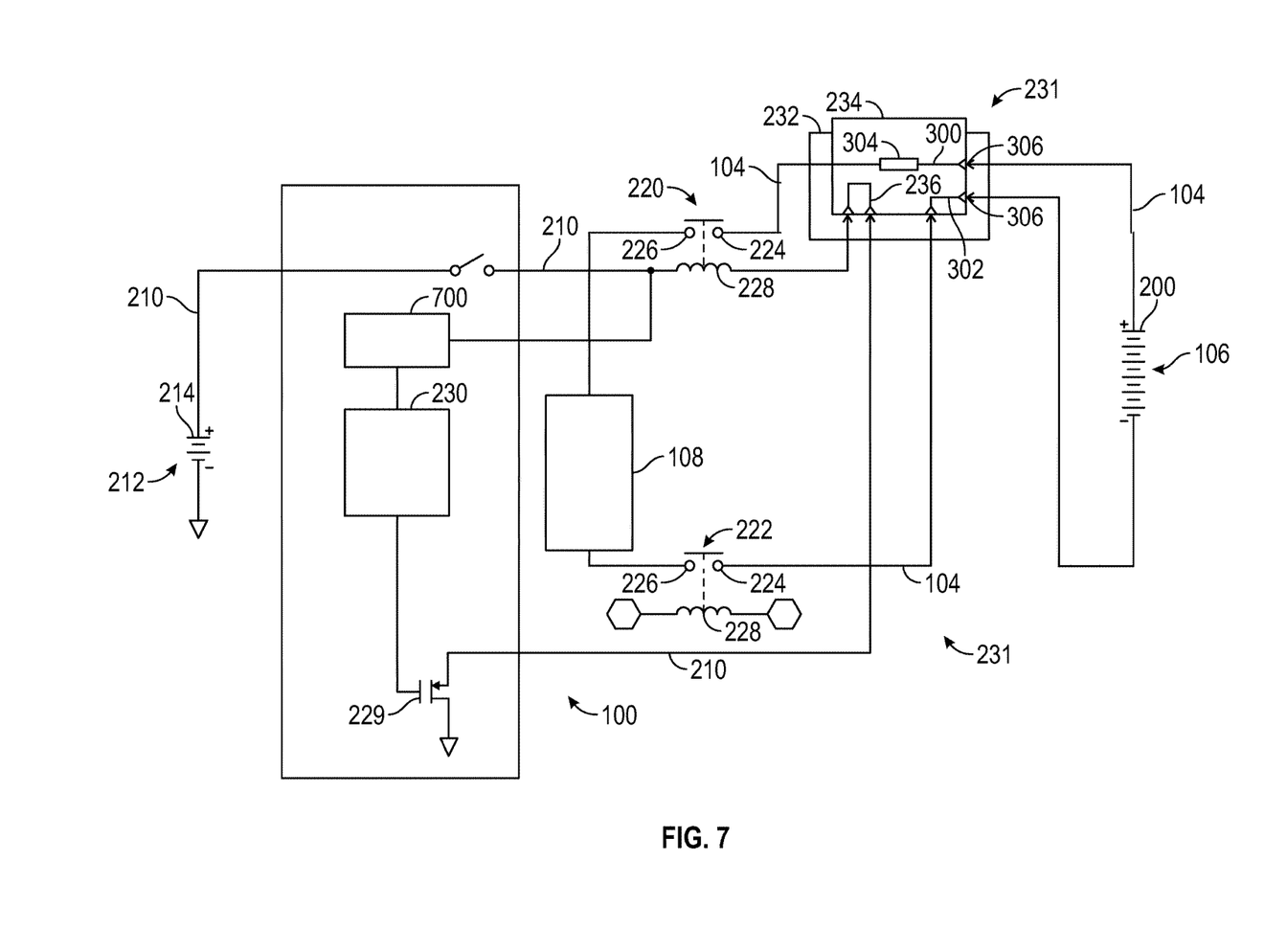
FIG. 7 is an electrical schematic diagram of the electrical system with the LV electrical circuit electrically coupled to an analog-to-digital converter ("ADC") according to one exemplary embodiment.

Referring now to FIG. 7, the electrical system 100 may include an analog-to-digital converter ("ADC") 700 electrically connected to the LV electrical circuit 210 for sensing voltage of the LV electrical circuit 210. In the exemplary embodiment, the ADC 700 is electrically connected to the high-side of the coil 228 of the positive contactor 220. However, it should be appreciated that the ADC 700 may be electrically connected at other points in the LV electrical circuit 210 and/or to the coil 228 of the negative contactor 222.

The ADC 700 is in communication with the controller 230 such that the controller 230 may receive data and/or other signals from the ADC 700. With communication from the ADC 700, the controller 230 is configured to determine the voltage present on the LV electrical circuit 210. The controller 230 may then determine that the voltage of the LV electrical circuit 210 is insufficient to properly actuate the contactor 220, 222. The controller 230 may then prevent the contactor 220, 222 from closing, and thus prevent damage to the contactor 220, 222. Notably, the electrical system 100 of the embodiment shown in FIG. 7 does not require a high-voltage interlock ("HVIL") loop to be routed through the disconnect mechanism 231.

Figure 8:
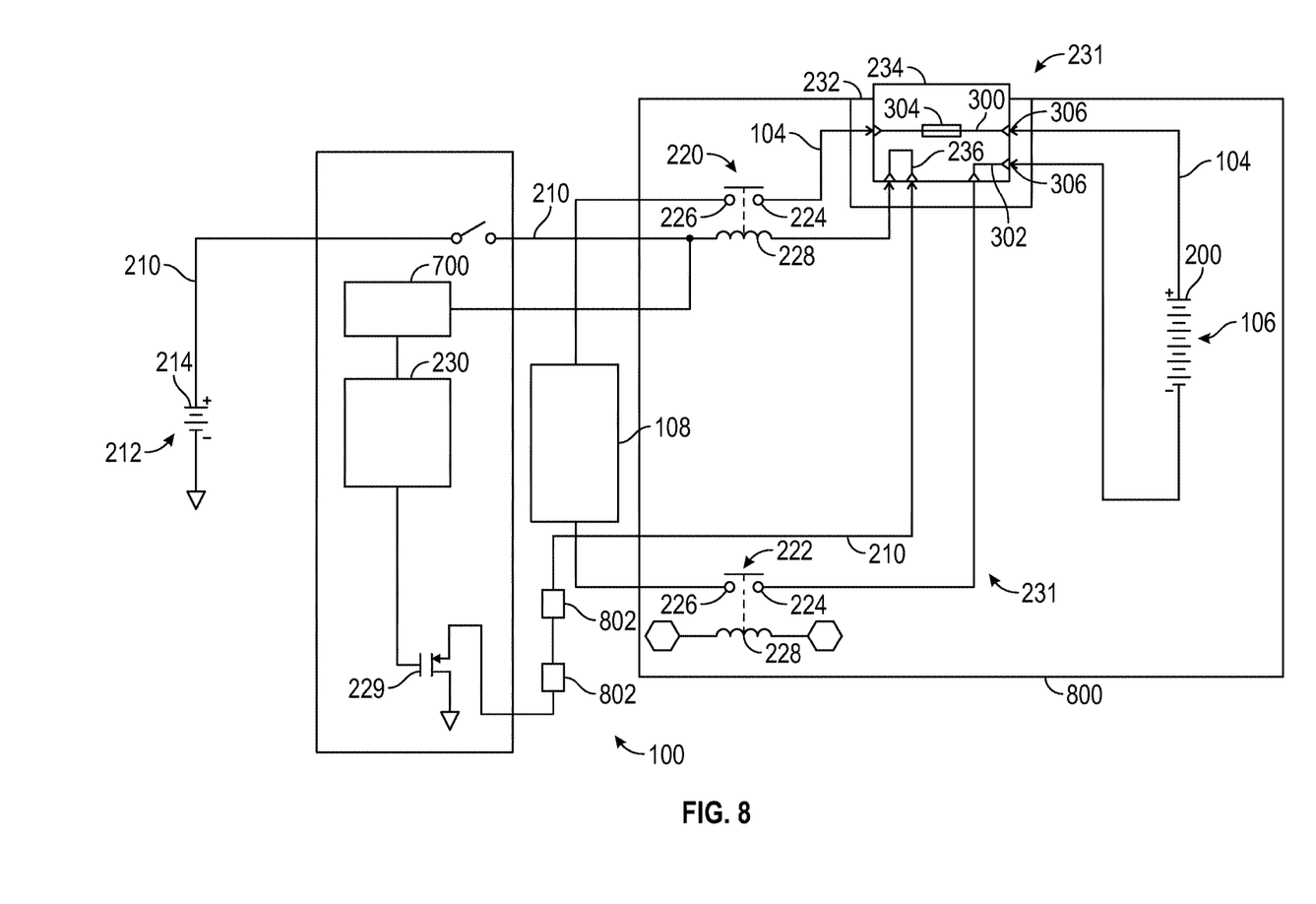
FIG. 8 is an electrical schematic diagram of the electrical system with the LV electrical circuit including LV access points.

With reference to FIG. 8, the HV power supply 106 and the contactors 220 may be encased in a housing 800 that prevents access by users and/or technicians for safety reasons. As such, other critical modules 802 may be disposed outside of the housing 800 and electrically connected to the LV electrical circuit 210. By connecting these modules 802 to the LV electrical circuit 210, the module 802 may be able to deduce the status of and/or problems with the HV electrical circuit 104.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An electrical system comprising:
   a contactor having a pair of contacts and a coil configured to electrically close and open the contacts;
   a high voltage ("HV") electrical circuit including a power supply electrically connected to at least one of the contacts of the contactor;
   a low voltage ("LV") electrical circuit electrically connected to the coil and configured to selectively energize the coil of the contactor;
   a disconnect mechanism coupled with the LV electrical circuit and operable to electrically open the LV electrical circuit to actuate electrical opening of the contacts of the contactor;
   wherein the disconnect mechanism includes a receptacle and a plug that is completely removable from the receptacle;
   wherein the plug is formed in part of a non-conductive material, and the plug includes a conductive path to complete the LV electric circuit when the plug is disposed in the receptacle; and
   at least one HV access point is exposed in the receptacle when the plug is removed from the receptacle to allow electrical measurement of the power supply of the HV electrical circuit.

2. The electrical system as set forth in claim 1 wherein the disconnect mechanism is coupled with the HV electrical circuit for electrically opening the HV electrical circuit.

3. The electrical system as set forth in claim 2 wherein the LV electrical circuit is opened prior to the HV electrical circuit being opened.

4. The electrical system as set forth in claim 2:
   wherein the power supply includes a positive pole and a negative pole;
   wherein the contactor comprises a positive contactor having a pair of contacts and a coil configured to electrically close and open the contacts and a negative contactor having a pair of contacts and a coil configured to electrically close and open the contacts;
   wherein the disconnect mechanism electrically connects the positive pole of the power supply and one of the contacts of the positive contactor and is operable to electrically disconnect the positive pole of the power supply from one of the contacts of the positive contactor; and wherein the disconnect mechanism electrically connects the negative pole of the power supply and one of the contacts of the negative contactor and is operable to electrically disconnect the negative pole of the power supply from one of the contacts of the negative contactor.

5. The electrical system as set forth in claim 2 wherein the power supply is further defined as a battery having a plurality of cells.

6. The electrical system as set forth in claim 5 wherein the disconnect mechanism is disposed in series between two of the cells.

7. The electrical system as set forth in claim 1 wherein the disconnect mechanism further includes a fuse disposed in series with the HV electrical circuit.

8. The electrical system as set forth in claim 1 wherein the at least one HV access point is electrically connected to the power supply.

9. The electrical system as set forth in claim 1 further comprising a sense resistor disposed in series with the LV electrical circuit to sense the current flowing through the coil of the contactor for determining a fault in the contactor.

10. The electrical system as set forth in claim 1 wherein the LV electrical circuit further comprises at least one transistor electrically connected to the coil for selectively energizing the coil.

11. The electrical system as set forth in claim 1 further comprising an analog-to-digital converter ("ADC") electrically connected to the LV electrical circuit for sensing voltage and/or current of the LV electrical circuit.

12. The electrical system as set forth in claim 1:
wherein the power supply includes a positive pole and a negative pole;
wherein the contactor comprises a positive contactor electrically connected to the positive pole and having a pair of contacts and a coil configured to electrically close and open the contacts and a negative contactor electrically connected to the negative pole and having a pair of contacts and a coil configured to electrically close and open the contacts;
wherein the disconnect mechanism is coupled with the LV electrical circuit and operable to electrically open the LV electrical circuit to actuate electrical opening of the contacts of the positive contactor and the negative contactor.

13. The electrical system as set forth in claim 12 further comprising a first sense resistor disposed in series with the positive contactor to sense the current flowing through the coil of the positive contactor for determining a fault in the positive contactor and a second sense resistor disposed in series with the negative contactor to sense the current flowing through the coil of the negative contactor for determining a fault in the negative contactor.

14. The electrical system as set forth in claim 1 wherein the disconnect mechanism is characterized by the absence of a resistor that detects whether the plug is removed from the receptacle.

15. A vehicle comprising:
a contactor having a pair of contacts and a coil configured to electrically close and open the contacts;
a high voltage ("HV") electrical circuit including a power supply electrically connected to at least one of the contacts of the contactor;
a load electrically connected to the HV electrical circuit for receiving electrical power from the power supply and driving at least one wheel;
a low voltage ("LV") electrical circuit electrically connected to the coil and configured to selectively energize the coil of the contactor;
a disconnect mechanism coupled with the LV electrical circuit and operable to electrically open the LV electrical circuit to actuate electrical opening of the contacts of the contactor;
wherein the disconnect mechanism includes a receptacle and a plug that is selectively removable from the receptacle;
wherein the plug is formed in part of a non-conductive material, and the plug includes a conductive path to complete the LV electric circuit when the plug is disposed in the receptacle; and
at least one HV access point is exposed in the receptacle when the plug is removed from the receptacle to allow electrical measurement of the power supply of the HV electrical circuit.

16. The vehicle as set forth in claim 15 wherein the disconnect mechanism is coupled with the HV electrical circuit for electrically opening the HV electrical circuit.

17. The vehicle as set forth in claim 16 wherein the LV electrical circuit is opened prior to the HV electrical circuit being opened which causes the load to disconnect from the power supply of the HV electrical circuit prior to opening the HV electrical circuit via the disconnect mechanism.

18. The vehicle as set forth in claim 15 wherein the disconnect mechanism is characterized by the absence of a resistor that detects whether the plug is removed from the receptacle.

* * * * *